June 22, 1943.  F. H. MOREHEAD  2,322,379
LUBRICATED PLUG VALVE
Filed Feb. 28, 1942
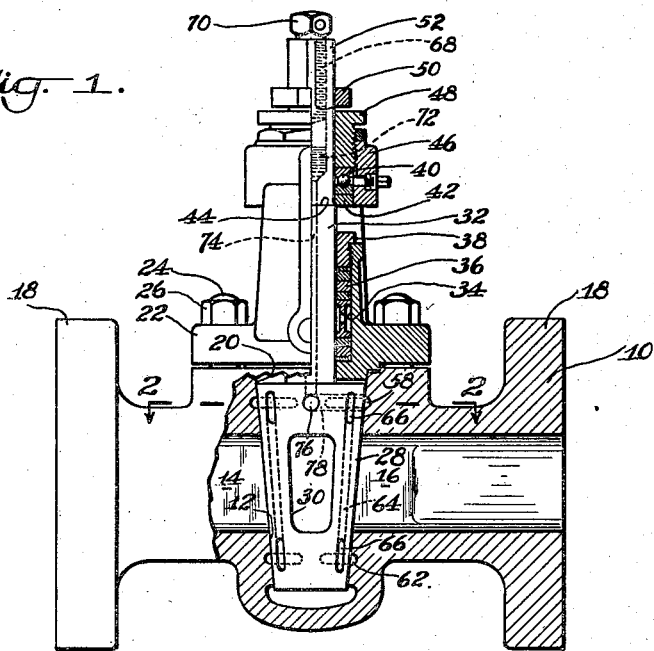
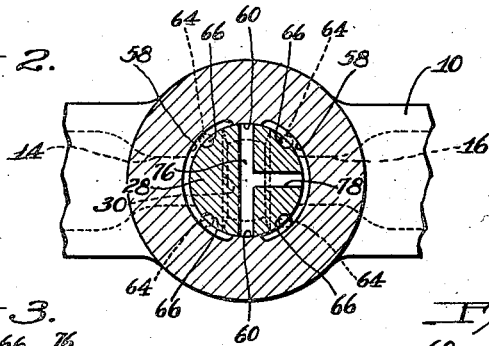
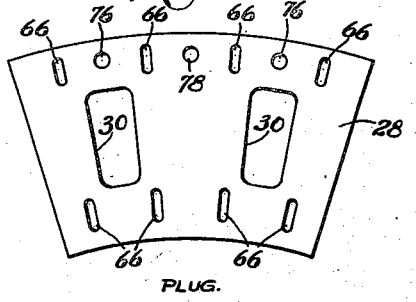
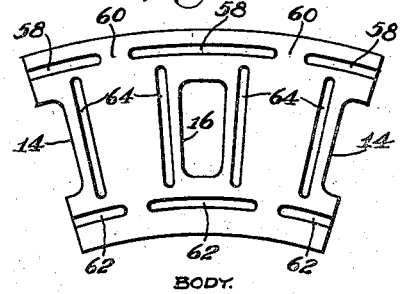
INVENTOR.
FRENCH H. MOREHEAD.
BY
ATTORNEY.

Patented June 22, 1943

2,322,379

UNITED STATES PATENT OFFICE 2,322,379

LUBRICATED PLUG VALVE

French H. Morehead, Riverside, Conn., assignor to Walworth Patents Inc., Boston, Mass., a corporation of Massachusetts Application February 28, 1942, Serial No. 432,819

4 Claims. (Cl. 251—93)

This invention relates to lubricated plug valves and more particularly to the lubrication system thereof.

In Patent No. 2,093,091 the lubricant distributing grooves were divided into two systems, one upstream and the other downstream and all the grooves were formed in the seating surface of the valve body. By arranging suitable cutoff pockets or dwarf grooves in the plug seating surface a connection could be made with the lubricant reservoir and the downstream system alone when the valve was closed. When the valve was turned to open position connection was made automatically with both the upstream and the downstream systems to supply both seating surfaces simultaneously.

In arrangements such as that described, the problem of supplying lubricant selectively to the seating surface which required lubrication was satisfactorily solved. The present invention has for its object the equal distribution of the lubricant after it has been selectively supplied. Thus without sacrificing any of the advantages of the prior developments permitting restricted supply in closed position and unrestricted supply in open position, a complete distribution of lubricant over the entire selected area is assured.

In the accompanying drawing:

Fig. 1 is a front view partly in section of a lubricated plug valve embodying the invention;

Fig. 2 is a partial section taken on the line 2—2 of Fig. 1; and

Figs. 3 and 4 are geometrical developments of the seating surfaces of the plug and body members respectively.

Referring more particularly to the drawing, the valve comprises a body member 10 having a tapered valve seat 12 provided with fluid passageways 14 and 16 extending transversely thereof. The fluid passageways 14 and 16 extend from the valve seat 12 completely through the body 10 and flanged portion 18 or other suitable means may be provided on the terminal ends of the body 10 for securing the valve in a pipe line. At the larger end of the valve seat 12 is a recess 20 provided for the reception of part of an annular cover 22 which is secured to the body 10 by means of the studs 24 and nuts 26.

Seated in the body 10 and rotatably engaging the valve seat 12 is a tapered plug member 28 having a port 30 extending transversely therethrough and being adapted to register with the passageways 14 and 16 when the valve is in open position. A stem 32 extends from the larger end of the plug member 28 through the cover 22, a portion of which is recessed as at 34 for the reception of a packing 36. The packing may be compressed into engagement with the stem 32 by means of a gland 38 which is adjustable by threaded engagement with the cover 22.

The plug member 28 may be retained in its seat by the provision of an anti-friction bearing 40 seated on a retainer member 42 engaging with a shoulder 46 on the stem beyond the packing gland 38. The bearing 40 and retainer 42 are housed in a yoke 46 forming part of the cover member 22 and provided with an adjusting nut 48 for positioning the bearing 40. A limit stop, in the form of a collar 50 non-rotatably slidable on a non-circular portion 52 on the stem, may be provided for engagement with a suitable fixed stop (not shown) on the yoke 46 to limit rotation of the plug member to substantially 90 degrees from the full open to full closed position. A portion of the non-circular end 52 of the stem 32 projects beyond the collar 50 and may be engaged by a wrench or other tool for rotating the valve member 28 in its seat.

The valve seat 12 formed in the body 10 is provided with a pair of diametrically opposite transverse lubricant grooves 58, each of which is located above one of the fluid passageways 14 and 16 respectively. The grooves together substantially surround the seating surface of the body 10 but have blind ends providing a pair of diametrically opposite lands 60. The seating surface 12 is further provided with a pair of diametrically opposite transverse grooves 62, each located below one of the fluid passageways 14 and 16 and having blind ends similar to the lubricant grooves 58 which are positioned thereabove. Furthermore, the valve seat 12 is provided with four longitudinal grooves 64 which are located on each side of the passageways 14 and 16 between the transverse grooves 58 and 62 at each end of the body, but these longitudinal grooves terminate short of connection with the transverse grooves 58 and 62.

The seating surface of the plug member 28 in this instance is provided with eight dwarf grooves or cutoff pockets 66, four of which are located above the port 30 in the valve member 28 and the remaining four therebelow. These dwarf grooves 66 are arranged in pairs, one at each end of the longitudinal grooves 64, and are adapted to overlie the ends of the longitudinal grooves 64 and connect with the transverse grooves 58 and 62 when the valve is in full open or full closed positions. When the valve member 28 is rotated in the valve seat 12 from the full-open or full-closed positions, the dwarf grooves 66 therein are immediately disconnected from communication with the longitudinal grooves 64 and thus the complete framing of the passageways is no longer present. During the rotating movement of the plug member 28, two of the diametrically opposite longitudinal grooves 64 will be exposed to fluid in the line as the port 30 passes across them. For this reason, it has been arranged that these exposed grooves shall cut off, as described, from the lubricant supply during this period.

Lubricant is supplied to the grooves from a reservoir 68 formed in the upper portion of the valve stem 32. The reservoir 68 is threaded for the reception of a compressor screw 70 and is provided with a check valve 72 to prevent regress of lubricant therefrom when the compressor screw 70 is removed. The reservoir 68 communicates with a passage 74 extending axially of the valve stem and terminating in the upper portion of the valve member 28.

The structure so far described is similar to that described and shown in Patent No. 2,093,091 previously referred to, but it will be apparent hereinafter that the lubrication system of the present invention may be used in connection with the combination of transverse, longitudinal and dwarf grooves described, or modified forms of lubricant groove arrangements. Moreover, while a high pressure type of ball-bearing valve has been illustrated and described it will be understood that the lubricating system is not limited to this type but may be used with other suitable structures where required.

In order to feed lubricant under pressure to one side only of the valve described, when in closed position, and to both sides of the valve when in open position, a plurality of lubricant ducts is employed. In this embodiment a duct 76 extends transversely through the valve member 28 in substantially the same plane as the dwarf grooves 66 therein at the larger end of the valve member 28. The duct 76 communicates at its center portion with the passage 74 from the reservoir 68 and its opposite open ends are arranged intermediate oppositie pairs of the dwarf grooves 66. When the valve member 28 is in the closed position the open ends of the duct 76 communicate with the lands 60 between the upper transverse grooves 58. Thus in this position the flow of lubricant under pressure from the duct 76 is restrained. Another lubricant duct 78 extends transversely of the duct 76 but on one side only thereof, the two ducts thus forming a T-shaped opening. The duct 78 is also in the plane of the upper pair of dwarf grooves 66 and its open end is arranged intermediate two of these dwarf grooves 66. Thus, in the closed position of the valve, the duct 78 communicates with the transverse groove 58 above one fluid passageway 16 in the body member 10 intermediate the longitudinal grooves 64, and lubricant under pressure may be distributed therefrom. When the valve member 28 is rotated to full-open position, the duct 76 occupies a position approximately ninety degrees from the closed position and thus communicates with both transverse grooves 58 above the passageways 14 and 16. The open end of the duct 78 at this time is opposite one of the lands 60 and no lubricant can flow therefrom.

It will be apparent therefore, that in the closed position of the valve, lubricant under pressure is distributed only from the duct 78 and such lubricant first enters the transverse groove 58 before reaching the longitudinal grooves 64 for distribution to the lower transverse grooves 62. If lubricant under pressure is fed first to the longitudinal grooves 64 it seldom reaches the median portion of the transverse grooves 58 and 62 but flows immediately down the longitudinal grooves from where it is dissipated to the seating surfaces adjacent these grooves. Consequently, those portions of the seating surfaces of the valve adjacent the median portion of the transverse grooves 58 and 60 are unlikely to receive lubricant at any time. When the plug member is controlling fluids under high line pressure these portions are the most close fitting and, if unlubricated, seizure and galling of the surfaces can more readily occur. By providing that lubricant under pressure will be fed first to points intermediate the longitudinal grooves 64 above the body passageways, the lubricant is effectively distributed to the entire area of the seating surface around one of the body passageways instead of being unequally distributed about the longitudinal grooving. In the open position of the valve a similar effective distribution will occur except that the seating surface areas around both body passageways receive lubricant.

As in the prior patented structure, the lubrication is selective to the downstream seating surface area in closed position and to both seating surface areas in open position. By reversing the limit stop 50 the opposite side of the valve seating surface can be lubricated in closed position to accommodate change in direction of pressure from the line fluid.

It will be understood that the location of the lubricant grooves is not limited to the arrangement described herein. It will be apparent that the grooves shown and described as being in the valve seat could equally well be placed in the valve member while the grooves in the valve member could be formed in the valve seat. Moreover, the use of the cut-off pockets or dwarf grooves is not essential as by rearrangement of the transverse and longitudinal grooves such dwarf grooves could be dispensed with.

I claim:

1. In a lubricated plug valve, a body member having passageways for line fluid, a valve member rotatable in said body and having a port adapted to be moved into and out of registry with said passageways in different positions of said valve member establishing the full open and full closed positions of said valve, lubricant distributing recesses in one of said members extending adjacent said body passageways, land portions intermediate said passageways and separating said recesses, and lubricant ducts in the other said member adapted to communicate with certain of said recesses and with said lands in the full closed position and alternately with other of said recesses and said lands upon rotation of the valve member to the full open position so that the lubricant is distributed adjacent selected body passageways in said different positions of said valve.

2. In a lubricated plug valve, a body member having a valve seat and fluid passageways intersecting said seat, a valve member rotatable in said seat and having a port adapted to be moved into and out of registry with said passageways in different positions of said valve, a lubricant reservoir associated with said valve, lubricant distributing recesses in one of said members extending adjacent said body passageways, land portions intermediate said passageways and separating said recesses, and an angular lubricant duct extending from said reservoir and having one leg thereof communicating with the recess adjacent one of said passageways in the full closed position of said valve, another leg of said lubricant duct communicating with at least one of said land portions in said full closed position of said valve to confine distribution of the lubricant to the first said leg, said duct being movable to a different position upon rotation of the valve member to the full open position so that the lubricant is distributed to the seating surfaces adjacent selected body passageways in said different positions of said valve.

3. In a lubricated plug valve, a body member having a valve seat and fluid passageways intersecting said seat, a valve member rotatable in said seat and having a port adapted to be moved into and out of registry with said passageways to establish the full open and full closed positions of said valve, transverse lubricant grooves above and below said passageways, land portions separating said transverse grooves, longitudinal lubricant grooves on each side of said passageways, said grooves being connected to substantially surround the port and passageways in the said full open and full closed positions of said valve, and a plurality of lubricant ducts for feeding lubricant under pressure to said grooves for distribution to said valve seat, each duct being adapted to communicate alternately with at least one of said transverse grooves intermediate said longitudinal grooves and with at least one of said land portions, said communication occurring when the valve is in said full open and full closed positions.

4. In a lubricated plug valve, a body member having a valve seat and fluid passageways intersecting said seat, a valve member engaging said seat and provided with a port adapted to register with said passageways when the valve is in full open position and extending normal thereto when the valve is in full closed position, a lubricant reservoir in said valve member, transverse lubricant grooves located above and below the body passageways at each end thereof, longitudinal grooves at each end of said transverse grooves to connect the grooves above and below said passageways when the valve is in full open or full closed positions, land portions intermediate said passageways and separating said transverse grooves, a lubricant duct extending from said reservoir and communicating with the transverse groove above one of said passageways and at a point intermediate the longitudinal grooves therefor when the valve is in full closed position, and a second lubricant duct extending from said reservoir transversely of the first said duct and communicating with the land portions in said full closed position to confine distribution of lubricant from said reservoir to the first said duct and thus to the grooves around a selected body passageway, said valve member being movable to the full open position where the first said duct communicates with one of said land portions and the second said duct communicates with the transverse grooves above each of said body passageways so that in the said full open position of said valve the lubricant is distributed equally to all of the grooves.

FRENCH H. MOREHEAD.